United States Patent [19]

Weidlich et al.

[11] 4,212,610
[45] Jul. 15, 1980

[54] DEVICE USED IN FIXING WITH A CASTING MATERIAL A SLEEVE INSERT HAVING A TERMINAL FLANGE

[75] Inventors: Dieter H. Weidlich, Frankfurt am Main; Willy Brückner, Donauwörth, both of Fed. Rep. of Germany

[73] Assignee: Camloc Fastener GmbH, Kelkheim, Fed. Rep. of Germany

[21] Appl. No.: 960,640

[22] Filed: Nov. 14, 1978

[30] Foreign Application Priority Data

Nov. 14, 1977 [DE] Fed. Rep. of Germany ....... 2750829

[51] Int. Cl.² .......................... E04B 2/38; B29C 27/00
[52] U.S. Cl. ....................................... 425/110; 52/787; 244/131
[58] Field of Search ................. 425/110, 59, 114, 191; 244/131, 132; 52/787, 127

[56] References Cited

U.S. PATENT DOCUMENTS

| | | | |
|---|---|---|---|
| 3,016,578 | 1/1962 | Rohe | 52/787 |
| 3,217,363 | 11/1965 | Rohe et al. | 425/110 |
| 3,339,609 | 9/1967 | Cushman | 52/787 |
| 3,482,007 | 12/1969 | Routhe | 425/110 |
| 3,510,916 | 5/1970 | Paelan | 425/110 |
| 3,571,857 | 3/1971 | Rhyne | 425/110 |
| 3,800,741 | 4/1974 | Boulton | 425/110 |
| 4,009,550 | 3/1977 | Young | 52/127 |

Primary Examiner—Murray Tillman
Assistant Examiner—A. H. Koeckert
Attorney, Agent, or Firm—Larson, Taylor and Hinds

[57] ABSTRACT

A device is disclosed for setting and securing a threaded member that is to be fixed with casting material in a recess or hole in laminar composite board-like members, such as those of honeycomb construction. The threaded member is of the type having a flange-like head to be located closely adjacent the plane of the outer skin of the composite material, and having a female threaded body extending into the recess with clearance, such that casting material injected into the clearance around the body will harden to secure the threaded member in the recess. The flange-like head has charging and venting openings for the injection. The setting device comprises a plate-like body formed with corresponding charging and venting openings, but of larger diameter than the recess opening, such that the device can be intimately applied with its underside against the flange-like head of the threaded member. A cylindrical projection from the center of the underside of the plate-like body extends into the threaded bore of the threaded member, where it is detachably held by friction. The plate-like body has an upstanding collar on its upper side that surrounds the charging and venting openings to catch any overflow of casting material, and the collar is formed with flattened portions for application of a wrench, such that after hardening of the casting material, the setting device is rotatable by a wrench to shear the casting material between the setting device and the threaded member, after which the setting device is removed.

10 Claims, 4 Drawing Figures

DEVICE USED IN FIXING WITH A CASTING MATERIAL A SLEEVE INSERT HAVING A TERMINAL FLANGE

This invention concerns a device used in fixing with a suitable casting material a sleeve insert. Particularly, but not exclusively concerning an insert to be set in a laminated composite board, the flange head of the insert having two vents, one for receiving casting material, the other allowing the air in the hole to escape. Devices of this type comprise a platelike plastic body, with holes corresponding to the vents in the insert which is of larger diameter than the aperture in the composite board, its underside being in contact with both the flange of the insert and the surface of the board and having a central projecting piece which releasably engages in the threaded hole of the insert.

The present invention provides a device used in fixing with a casting material a sleeve insert in an aperture or recess, said insert having a terminal flange which includes at least one vent for the passage of casting material, the device comprising: a platelike body having on its upper surface a collar that surrounds a hole or holes registrable with the said vent or vents, said collar having on its periphery at least one pair of diametrically opposed flattened surfaces and in the centre of the underside of the body, a projection which can releasably enter the sleeve.

The device according to the invention thus forms a kind of bowl in which any overflow of casting material will be caught, and the flattened portions make possible the subsequent removal of the device after hardening of the casting material, with a wrench or similar tool, by twisting the device with the projecting piece as axis of rotation, thus the casting material in the vents in the insert and the holes in the device is sheared off in the plane of separation between these parts. For this shearing off only a short turn is necessary and then the platelike body can be withdrawn from the thread hole of the pin, similarly joining the device to the insert before installing in the aperture is quickly done, and the engagement formed by the projecting piece and the sleeve is sufficiently strong to ensure that the insert does not become detached from the device during the process of injecting casting material.

In a preferred embodiment the platelike body and its collar are made hexagonal, thus in the case of inserts required to be flush with the surface of the material receiving the pins there is sufficient covering of the annular gap between the head of the insert and the edge of the receiving aperture, and at the same time there will be provision for sufficiently large flattened parts to allow a wrench for example to grip and rotate the device.

In another preferred embodiment of the invention, the holes in the device that register with the vents in the insert are extended on the underside of the platelike body in projections preferably conical, that engage in similar depressions at the mouths of the vents in the insert, this results in on the one hand an improved seal between the device and the head of the pin in the injection process, and on the other hand a kind of cutter will be created which will facilitate the shearing off of the casting material in the holes. Moreover the holes in the device may taper in the the platelike body when moving towards the insert which further improves the cutting of the solidified casting material and also promotes the seal between the device and a suitably shaped injection nozzle.

Another embodiment of the invention provides means for engaging and holding the device to the outer surface of the receiving material board, to prevent its coming loose in course of removal of the device for injecting casting material from the board surface, and pulling out the pin. This is achieved by an adhesive foil coated on both sides which preferably covers the whole underside of the platelike body, with openings for the vents. This has the further advantages of improving both the adhesion and seal between the head of the insert and the device. Preferably the adhesive force between the foil and the platelike body is greater than the adhesive force of the other adhesive layer, so that during removal, the foil will stick to the platelike body rather than to the insert.

A further embodiment of the invention provides for engaging and holding the device to a laminated composite board comprising two lugs on the underside of the platelike body extending through diametrically opposed recesses in the edge of the flange head of the insert, so that when an inset attached to the device is set into a composite board the lugs will clip under outer skin of the board. Upon removal of the device after hardening of the casting material the lugs are sheared off.

The invention will now be described by way of example with reference to, and as illustrated in the accompanying drawings.

Figure 1:
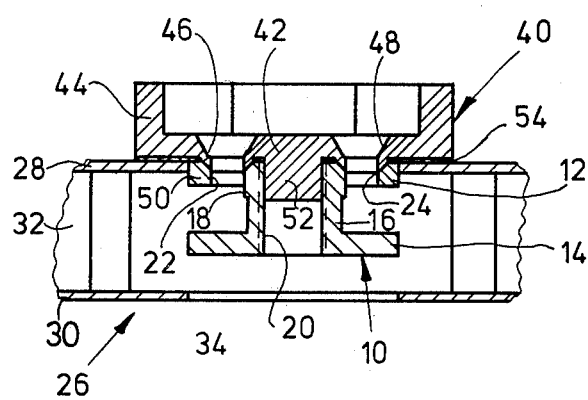
FIG. 1 shows an axial section through a first embodiment of the invention, for fastening a steel pin with an upper and lower flange, in a lightly constructed laminated composite board, such as is used for the inner walls of aircraft.
Figure 2:
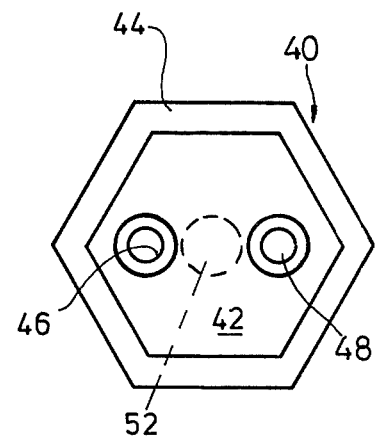
FIG. 2 is a top view of the device of FIG. 1.

A threaded pin 10 such as is customarily used in aircraft construction, consists of a flange head 12, a flange foot 14 and a relatively thin neck 16 between them, on which a tooth 18 can be disposed to prevent the pin from rotating once it has been set in place. The pin 10 has a central threaded hole 20 as well as two vents 22, 24 parallel to the axis and diametrically opposed in the flange head 12, one for injection of casting material the other for air to escape.

A lightly constructed composite board 26 consists of two outer skins 28, 30 and a honeycomb core 32. An aperture 34 is formed to the threaded pin 10, its head 12 and its foot 14 with a close fit, through which there is cut in the core 32, between outer skins 28, 30 a cavity which is filled in by the casting material. In order to hold the threaded pin 10 in place during casting and at the same time in order to prevent casting material flowing onto the surface of the laminar composite board, a device 40 is provided, comprising a hexagonal body 42, with a hexagonal collar 44 on its upper side. Platelike body 42 has holes 46, 48 that are flush with vents 22, 24 in the head of the pin, which taper from above downward and are continued in conical projections 50 on the underside of platelike body 42, and engage in the suitably shaped mouths at the vents 22, 24 in head of the pin. In this way the lower edges of holes 46, 48 constitute cutting edges which facilitate the shearing off of the hardened casting material remaining in the holes when the device is rotated.

Platelike body 42 of the device also has on its underside a central cylindrical piece 52 which engages in the bore 22 of pin 10, and is capable of holding the pin and the device together.

Moreover, on the underside of platelike body 42 there is a thin foil 54, coated on both sides with adhesive, and which has holes that correspond to holes 46, 48. With this foil, the device is held on the upper side of outer skin 28 of laminated composite board 26, and in addition this foil provides a seal in the plane of separation between holes 22, 46 and 24, 48.

The threaded pin 10 is connected with device 40 before the pin is set into hole 34, and this can be done at the plant where the pin is manufactured. When the threaded pin with the device attached is set into board 26, an injection device is presented in a known way to vent 22, and liquid casting material is injected into the pin, which fills out the space between head 12 and foot 14 of the pin, and the cavities in core 32 of the laminated composite board 26. After hardening of the casting material, a wrench is applied to collar 44 and the device is turned about central piece 52, the device is torn loose from the pin, and the casting material in the plane of separation between the pair of holes 22, 46 or 24, 48 is sheared off.

Figure 3:
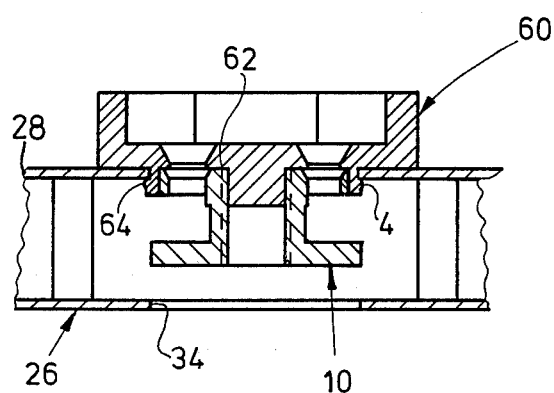
FIG. 3 is an axial section as in FIG. 1, with a modified embodiment of the invention.
Figure 4:
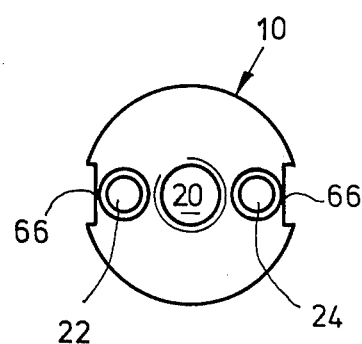
FIG. 4 is a top view of a pin of the type used in FIG. 3.

In the modified embodiment of the invention shown in FIGS. 3 and 4, platelike body 62 of device 60 has two diametrically opposed lugs 64 instead of a foil: said lugs engage in recesses 66 on the outer periphery of head 12 of the pin, and lock behind outer skin 28 of the laminated composte board. By this arrangement a foil such as that in the embodiment of FIG. 1 becomes unnecessary. Lugs 24 have a cross section that enables them to shear easily when the device is rotated.

What we claim is:

1. For use in setting and sealing a threaded member in a recess in a laminar composite board-like member by injecting casting material into the recess and around the threaded member disposed therein, the threaded member having a flange-like head intended to be secured in or closely adjacent the recess opening in the outer surface of the board-like member, a body portion for extending from the flange-like head into the recess, a threaded bore extending through the flange-like head into the body portion, and charging and venting openings in the flange-like head for communicating with the interior of the recess; a setting device comprising a plate-like body of larger diameter than the recess opening and having charging and venting openings corresponding to those of the threaded member such that the plate-like body can be intimately applied with its underside against the flange-like head of the threaded member with the respective charging and venting openings in alignment, a cylindrical non-threaded member projecting centrally from the underside of said plate-like body for frictional detachable engagement in the threaded bore of the threaded member, and an upstanding collar on the upper side of said plate-like body surrounding the charging and venting openings therein and forming a bowl-like container thereabout to hold any casting material issuing from either of the openings after injection through said charging opening into the interior of the recess, said collar having at least one pair of opposed flattenings on its periphery for application of a wrench, whereby said setting device can be coupled with a threaded member, the threaded member can then be mounted with clearance in a recess in a composite board-like member, casting material can be injected through the charging opening to harden in the recess around the threaded member, with any excess casting material issuing from the venting opening being contained within the bowl-like container formed by said upstanding collar, the setting device can be rotated by a wrench to shear off casting material in the charging opening or the venting opening between the plate-like body and the flange-like head, and the setting device can be removed from the set and sealed threaded member.

2. A setting device as claimed in claim 1, wherein the plate-like body and the collar are hexagonal in plan view.

3. A setting device as claimed in claim 1, wherein the charging opening and the venting opening of the plate-like body are extended on the underside thereof by conical collars which are engageable in conical depressions of the corresponding charging and venting openings in the flange-like head of the threaded member.

4. A setting device as claimed in claim 3, wherein the charging opening and the venting opening in the plate-like body taper conically from the upper side of the plate-like body.

5. A setting device as claimed in claim 1, including on its underside means for detachably securing the plate-like body to the outer skin of the laminar composite board.

6. A setting device as claimed in claim 5, wherein said securing means comprises an adhering foil coated on both sides with adhesive.

7. A setting device as claimed in claim 6, wherein said foil covers the entire underside of said plate-like body except for the charging and venting openings therein.

8. A setting device as claimed in claim 7, wherein the adhering of the adhesive layer between the foil and the plate-like body is greater than the adhering force of the other adhesive layer.

9. A setting device as claimed in claim 5, wherein said securing means comprise lug members projecting from the underside of the plate-like body so as to extend through two diametrically opposed edge recesses on the flange-like head of the threading member when the setting device is coupled with the threaded member, such that when the threaded member with the setting device is set into the laminar composite board the lug members will engage elastically behind the outer skin of the board, the lug members being so configured dimensioned as to be sheared off by turning of the setting device after the casting material hardens.

10. In combination, a setting device as claimed in claim 1 detachably coupled to said threaded member.

* * * * *